United States Patent [19]

Oikawa

[11] Patent Number: 5,563,719
[45] Date of Patent: Oct. 8, 1996

[54] DATA RECORDING/REPLAY DEVICE AND DATA RECORDING MEDIUM

[75] Inventor: Yoshiaki Oikawa, Kanagawa, Japan

[73] Assignee: Sony Corporation, Tokyo, Japan

[21] Appl. No.: 178,825

[22] Filed: Jan. 7, 1994

[30] Foreign Application Priority Data

Feb. 26, 1993 [JP] Japan .................................. 5-063382

[51] Int. Cl.$^6$ .................................................... H04N 1/44
[52] U.S. Cl. .................................................... 358/436
[58] Field of Search .......................... 371/40.1; 395/700;
358/403, 400, 402, 407, 444, 426–436,
438, 439

[56] References Cited

U.S. PATENT DOCUMENTS

| 3,994,014 | 11/1976 | Burgiss | 360/42 |
| 4,811,113 | 3/1989 | Ozeki et al. | 358/261.1 |
| 4,873,583 | 10/1989 | Kobayashi et al. | 358/310 |
| 5,210,761 | 5/1993 | Fukami et al. | 371/40.1 |
| 5,247,591 | 9/1993 | Baran | 382/61 |
| 5,278,903 | 1/1994 | Matsui et al. | 380/18 |

Primary Examiner—Allen R. MacDonald
Assistant Examiner—Thomas J. Onka
Attorney, Agent, or Firm—Jay H. Maioli

[57] ABSTRACT

A data recording and/or reproducing device for recording and/or reproducing data on or from a recording medium includes information concerning the recording method used for recording data on a recording medium, that is the encoding/decoding instruction data is recorded on the recording medium along with the data. Using the encoding/decoding instruction on the recording medium, specifically the decoding instruction, the data on the recording medium is restored by a DSP. The data recording and/or reproducing device enables data processed with an inconvenient system or an older model system to be restored easily and inexpensively.

6 Claims, 12 Drawing Sheets

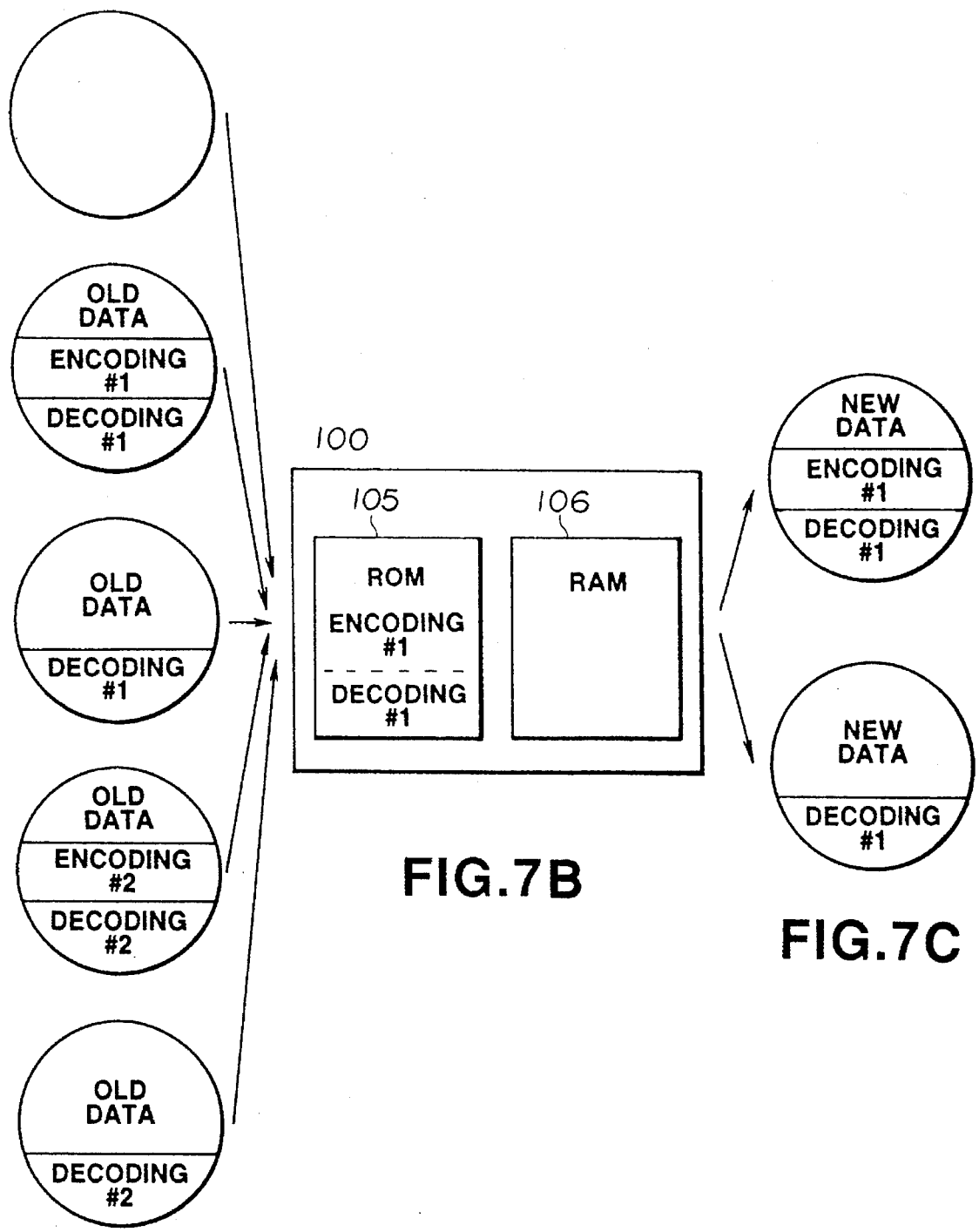

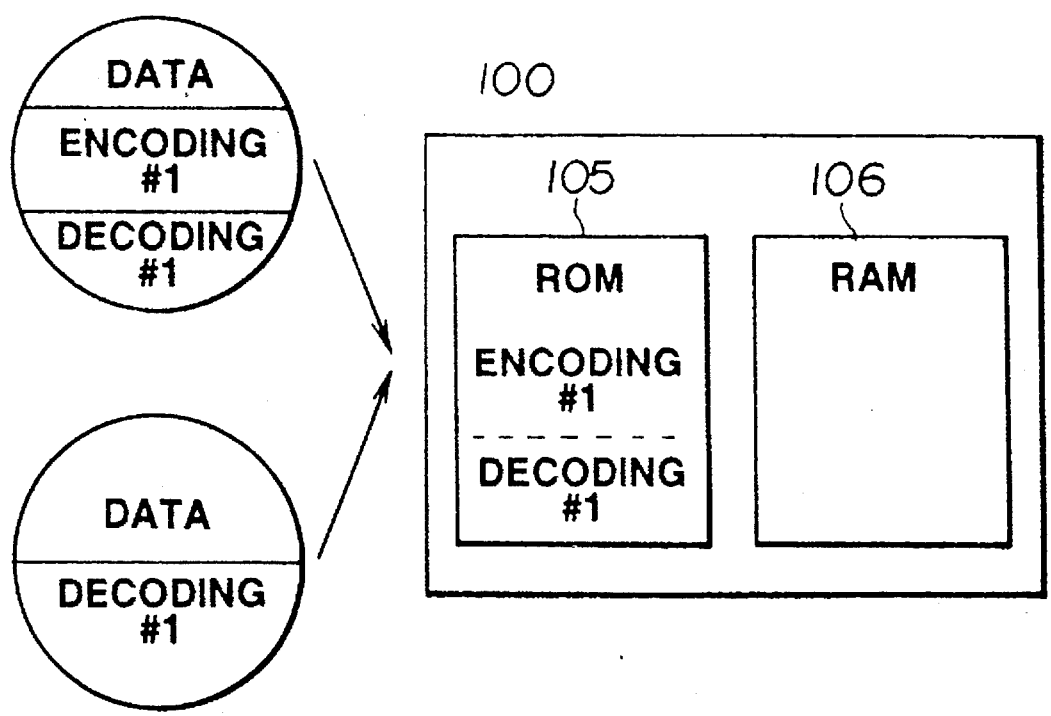
FIG.10A  FIG.10B

DATA RECORDING/REPLAY DEVICE AND DATA RECORDING MEDIUM

BACKGROUND OF THE INVENTION

This invention relates, to a data recording and/or reproducing device for recording and/or reproducing data on or from a recording medium. The present invention also relates to such recording medium.

An illustrative example of the conventional data recording and/or reproducing device is shown in FIG. 1. The device shown in FIG. 1 is a device for converting and companding music signals into digital data for recording and/or reproduction.

The conventional data recording and/or reproducing device 200, shown in FIG. 1, has a central processing unit (CPU) 101 for controlling the system of the device in its entirety, a random access memory (RAM) for the system 104 and a read-only memory (ROM) for the system 103.

A digital signal processor (DSP) 102 is used for executing arithmetic and logical operations for signals, while a signal processing ROM 105 and a signal processing RAM 106 are used for executing arithmetic and logical operation for signals in the DSP 102. In the signal processing ROM 105, there are pre-recorded instruction data for encoding and instruction data for decoding.

In the present data recording and/or reproducing device 200, a data read/write unit 107 writes and reads data between it and a recording medium 199, while a D/A converter 110 converts digital music data into corresponding analog music signals to output the resulting analog music signals to an audio output 108. An A/D converter 111 converts analog music signals entered at an analog input 109 into digital music data.

Interfacing between the user and the data recording and/or reproducing device 200 is accomplished by using a display unit 112 and a command input unit 113.

With the above-described device, recording/replay of music signals is performed in the following manner.

In recording, analog music signals, entered at an analog input unit 109, are converted by the A/D converter 111 into digital music data, which is compression-encoded by the DSP 102 in accordance with encoding instruction data written in the signal processing ROM 105 and is subsequently recorded on the recording medium 199 via the data read/write unit 107.

In replay, the compression-encoded data is read by the data read/write unit 107 from the recording medium 199 on which the compression-encoded data is pre-recorded. The compression-encoded data thus read is decoded by the DSP 102 in accordance with decoding instruction data written in the signal processing ROM 105. The decoded data is then converted by the D/A converter 110 into analog signals which are outputted at an audio output 108 as replay tousle signals.

Thus the digital music data can be processed only encoding instructions previously stored in the system, and can be reproduced only in a system having decoding instructions capable of reproducing the digital music data.

Consequently, although the recording/reproducing device has hardware capable of satisfactorily executing encoding or decoding instructions other than those stored thereby, it is only possible with the device to record data in accordance with its own stored set of encoding instructions, while data processed with the decoding instructions other than those stored therein cannot be reproduced even although the device can read the data. That is, encoding/ decoding can be made only with software previously stored in the device.

In the current status of the art, the recording medium itself is adapted to accommodate new equipment or hardware is specially designed for a specific recording medium. That is, interchangeablity is assumed not to be provided from the outset. Consequently, no particular problem exists even if the recording medium was recorded on by a device of an inconvenient system or with an old-fashioned device that cannot be reproduced by a new device.

The above-described status of the art favors the sale of a recording medium in which popular material is pre-recorded or a product employing a high performance or multi-functional system because of the possible differentiation from other conventional media or products.

However, if it is desired to purchase an popular music source processed by a plurality of processing systems, it is not possible for the software to accommodate the music source even though the properties of the device itself or the hardware are capable of executing the new processing systems, with the result that the user is obliged to purchase appropriate equipment capable of accommodating these new processing systems.

Recently, it as become popular to employ a recording medium from which the recorded data may be read by a comparatively simple operation, such as an IC card. However, in view of the current status of the art in which the processing by the device itself is executed by the DSP based on the stored program, it happens that, even though the device is capable of writing and reading the recorded data and recording and/or reproducing the data the recording/ reproduction cannot be accomplished solely because of the difference in the data processing system.

For solving the above-mentioned difficulties, it may be contemplated to provide the new devices with encoding or decoding instructions of the previous systems or inconvenient systems or to translate data recorded by the inconvenient system or the old-fashioned systems. However, if the new devices are to be equipped with the inconvenient systems or past encoding or decoding instructions, the device tends to suffer from increased redundancy. Besides, the data recorded in the past may be converted into data conforming to the new system only by a laborious converting operation with the risk of deterioration in the sound quality.

OBJECT AND SUMMARY OF THE INVENTION

In view of the above-described status of the art, it is an object of the present invention to provide a data recording and/or reproducing device capable of recording and/or reproducing data processed with different systems or past systems at low costs by a simplified construction, and a data recording medium.

In accordance with the present invention, there is provided a method for recording/reproducing data on or from a recording medium comprising recording the information concerning the method of recording the data on the recording medium on the recording medium along with the data and restoring the data on the recording medium by the recorded information concerning the recording method.

If the data recording device of the present invention has connected thereto a recording medium on which the information concerning a processing method for processing data in a pre-set manner and the information concerning a restoring method for restoring the data processed in the pre-set manner, and the data recording device itself is not provided with the information concerning the processing method for processing the data in a pre-set manner, that is the encoding instruction data nor with the restoring method for restoring the processed data, that is the decoding instruction data, the recording device reads the information concerning the processing method and the information concerning the restoring method to process the data in accordance with the information concerning the processing method as read from the recording medium. The recording device records the information concerning the processing method and the information concerning the restoring method on the recording medium along with the data processed by the information concerning the processing method.

Besides, if the data recording device itself is provided with the information concerning the processing method for processing the data in a pre-set manner, that is the encoding instruction data, and provided with the restoring method for restoring the processed data, that is, the decoding instruction data, the recording device proceeds to process the data in accordance with the information concerning the processing method stored thereby and records the information concerning the processing method and the information concerning the restoring method on the recording medium along with the data processed by the information concerning the processing method.

On the other hand, if the data recording device of the present invention has connected thereto a recording medium on which the information concerning a processing method for processing data in a pre-set manner (encoding instruction data) and the information concerning a restoring method for restoring the data processed in the pre-set manner (decoding instruction data), and the data recording device itself is provided with the information concerning the processing method for processing the data in a pre-set manner and with a restoring method for restoring the processed data, the recording device proceeds to read the information concerning the processing method and the information concerning the restoring method from the recording medium connected thereto and selects from the information concerning the processing methods stored thereby or the processing methods read from the recording medium to process the data in accordance with the selected processing method. The recording device records the selected information concerning the processing method and the information concerning the restoring method associated with the selected processing method on the recording medium along with the data processed by the selected information concerning the processing methods.

The data recording medium according to the present invention has recorded thereon the information concerning a processing method for processing data in a pre-set manner (encoding instruction data) and the information concerning a restoring method for restoring the data processed in the pre-set manner (decoding instruction data).

The data recording medium according to the present invention has recorded thereon the information concerning a processing method for processing data in a pre-set manner (encoding instruction data) and the information concerning a restoring method for restoring the data processed in the pre-set manner (decoding instruction data), along with the data processed in the pre-set manner.

The data recording medium according to the present invention has recorded thereon the information concerning a restoring method for restoring the data processed in the pre-set manner (decoding instruction data), along with the data processed in the pre-set manner.

If the data reproducing device according to the present invention has connected thereto a recording medium on which the information concerning a restoring method for restoring the data processed in the pre-set manner is recorded along with data processed in the pre-set manner, and the data recording device itself is not provided with the information concerning the restoring method for restoring the data processed in the pre-set manner, the recording device reads the information concerning the processing method from the recording medium connected thereto to restore the pre-processed data read from the recording medium in accordance with the information as read from the recording medium.

On the other hand, if the data reproducing device according to the present invention has connected thereto a recording medium on which the information concerning a restoring method for restoring the data processed in the pre-set manner is recorded along with data processed in the pre-set manner, and the data recording device itself is provided with the information concerning the restoring method for restoring the data processed in the pre-set manner, with the pre-processed data read from the recording medium being restorable by the information concerning the restoring method held by the reproducing device, the reproducing device proceeds to restore the pre-processed data read from the recording medium in accordance with the information concerning the restoring method held by the reproducing device.

Besides, if the data reproducing device according to the present invention has connected thereto a recording medium on which the information concerning a restoring method for restoring the data processed in the pre-set manner is recorded along with data processed in the pre-set manner, and the data recording device itself is provided with the information concerning the restoring method for restoring the data processed in the pre-set manner, with the pre-processed data read from the recording medium being not restorable by the information concerning the restoring method read from the recording medium, the reproducing device proceeds to restore the pre-processed data read from the recording medium in accordance with the information concerning the restoring method as read from the recording medium, by way of reproducing the recording medium.

According to the present invention, by recording the information concerning the recording method for recording data on the recording medium along with data, the data read from the recording medium may be restored, using the information concerning the recording method as read from the recording medium, by way of reproducing the recording medium.

BRIEF DESCRIPTION OF THE DRAWINGS

FIGS. 7A, 7B, and 7C are a diagrammatic view illustrating the state of recording by an encoding instruction owned by the present device.

FIGS. 10A and 10B are a diagrammatic view illustrating the state of reproduction by a decoding instruction owned by the present device.

DESCRIPTION OF THE PREFERRED EMBODIMENT

Figure 1:
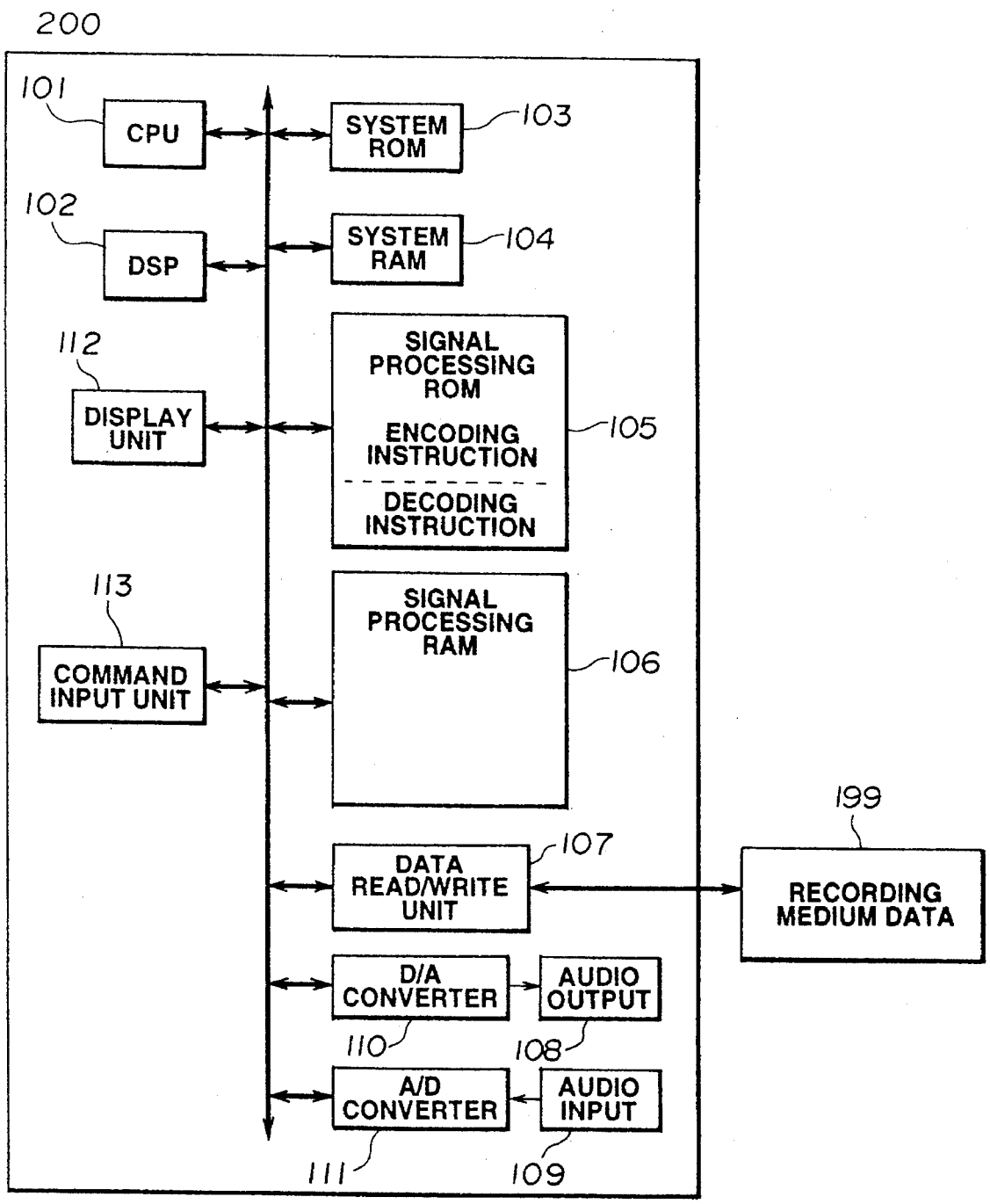
FIG. 1 is a block circuit diagram showing a concrete arrangement of a conventional recording/reproducing device.

Referring to the drawings, a preferred embodiment of the present invention will be explained in detail.

Figure 2:
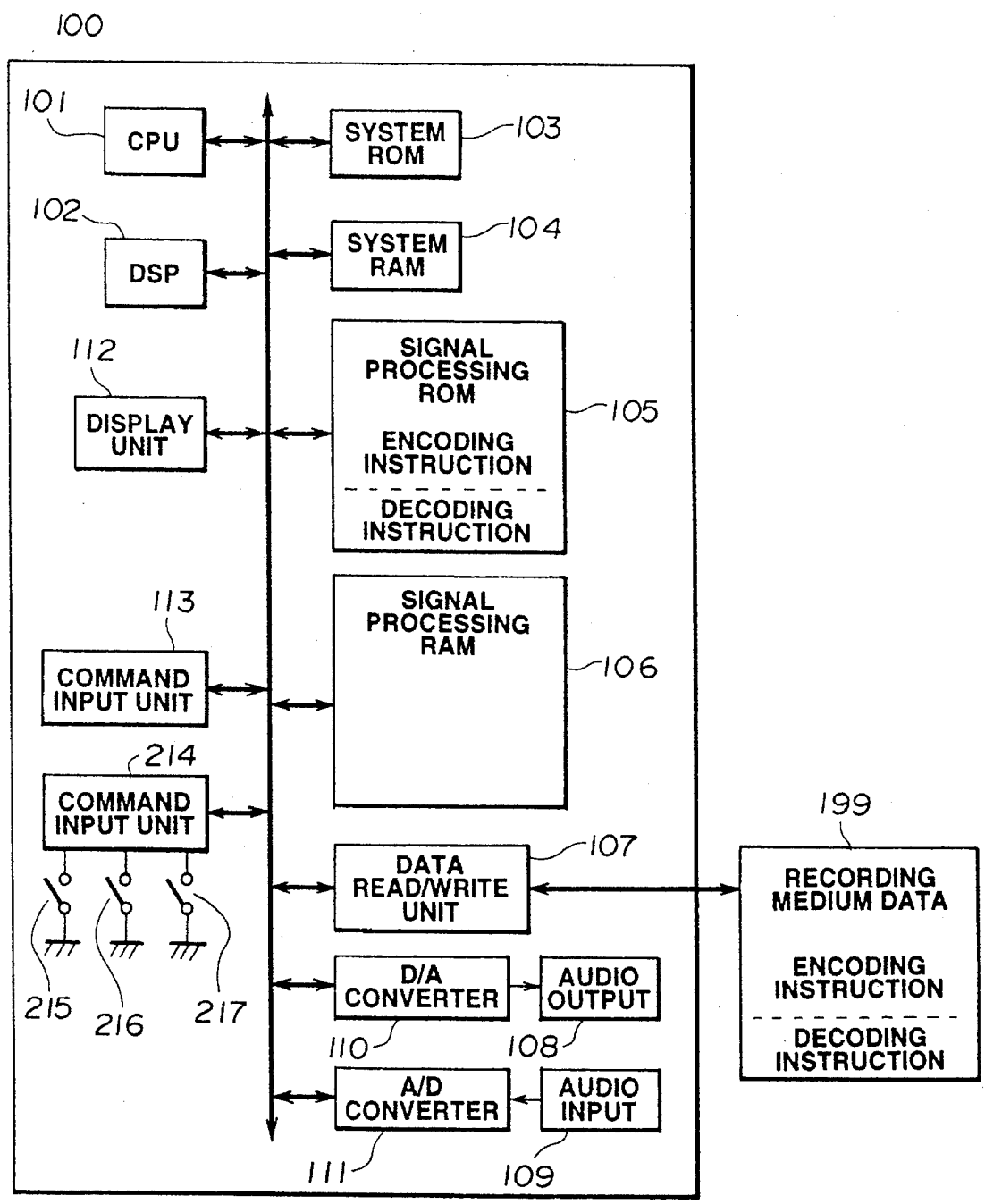
FIG. 2 is a block circuit diagram showing a concrete arrangement of a data recording and/or reproducing device according to the present invention.
Figure 5:
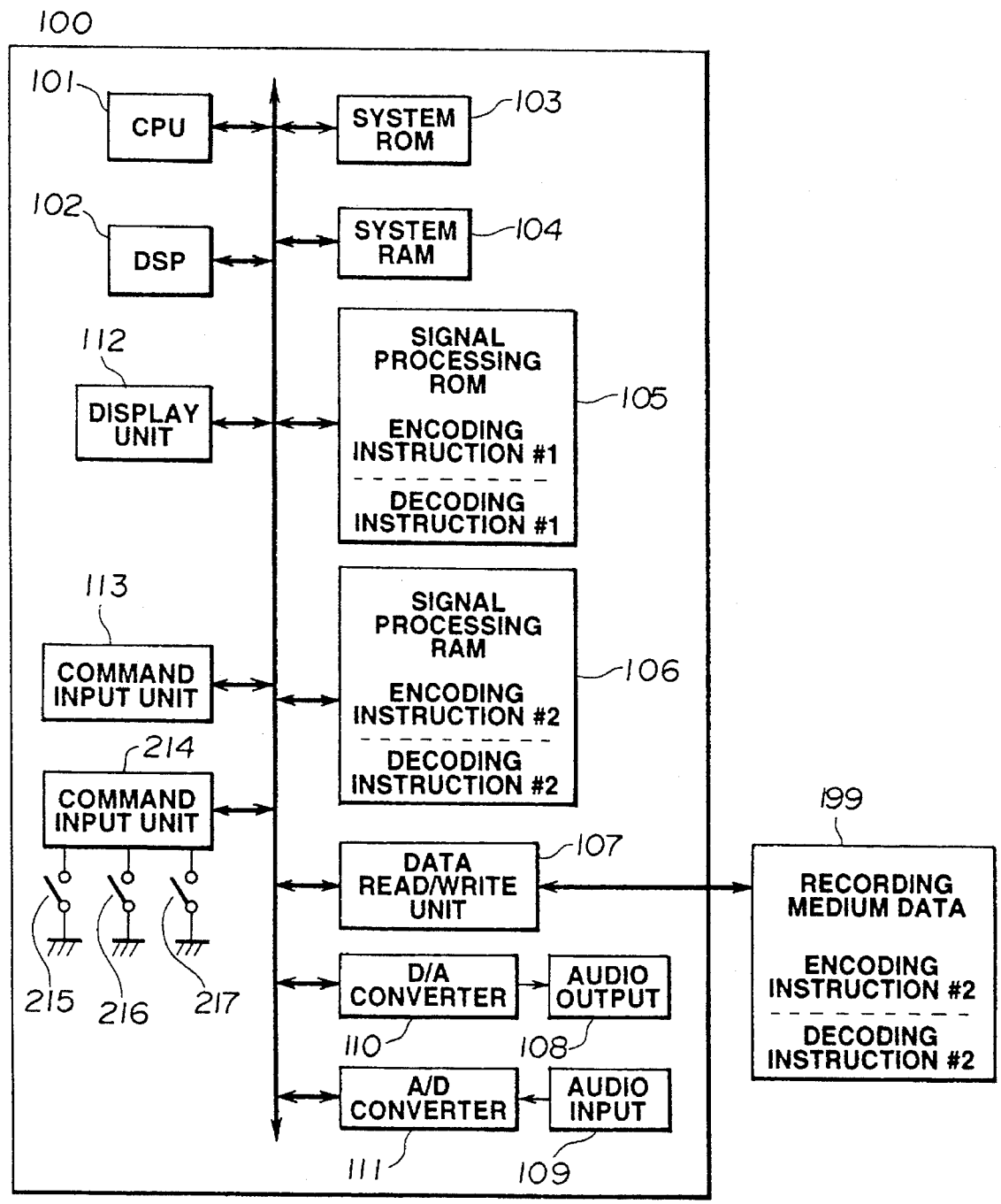
FIG. 5 is a block circuit diagram illustrating the state of recording and reproduction by the encoding/decoding instruction #2 recorded on the recording medium in the present device.
Figure 6:
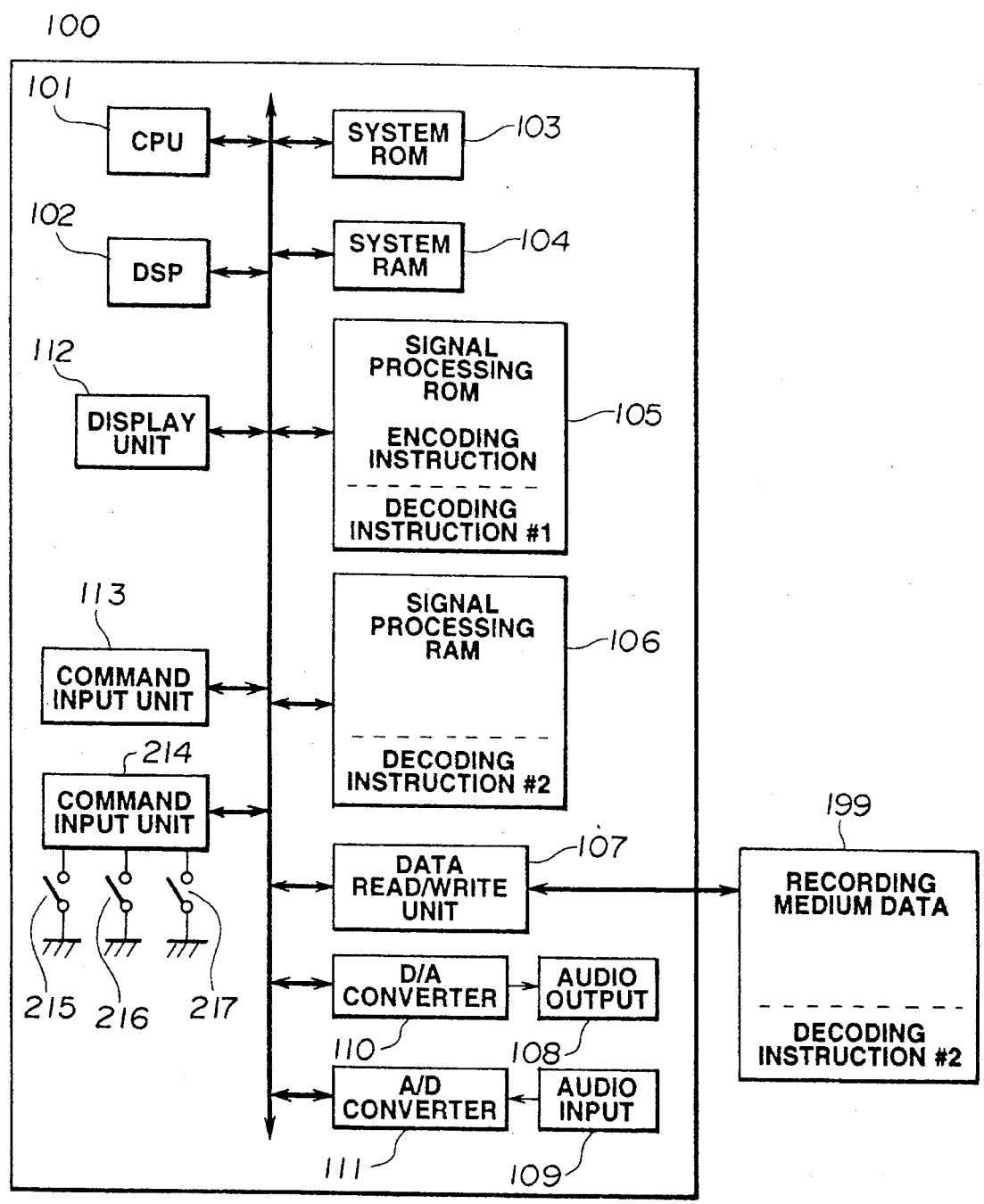
FIG. 6 is a block circuit diagram illustrating the state of reproduction by the decoding instruction recorded on the recording medium in the present device.

Referring to FIGS. 2, 5 and 6, there is shown a data recording and/or reproducing device 100 for recording data on or reproducing data from a recording medium 199. The information concerning the method of recording the data on the recording medium 199, that is the encoding/decoding instruction data, is recorded, along with data, on the recording medium 199, and the data recorded on the recording medium 199 is restored by the DSP 102 using the encoding/decoding instructions, more specifically, the decoding instruction, recorded on the recording medium 199.

Before proceeding to the description of the present device, the principle underlying the present invention is explained.

That is, the present invention has been made with an eye directed to the fact that the tendency of the hardware of a device working on data is towards a programming-oriented device centered about the DSP and that the IC card which permits easy writing of data will possibly become most prevalent in the near future as the recording medium.

The data processing in such device is determined by the program and different processing may be made by changing the program.

For this reason, if a program executing file is exchanged for another program executing file executing a different operation, and the executing file is executed, different processing may be performed on the same hardware.

For example, in the case of a recording/reproducing device, the encoding instruction for recording and the decoding instruction for replay are the programs indicating the processing sequences. If these processing sequences are changed to those of a different system, it becomes possible to perform recording/replay according to the inconvenient system.

According to the present invention, the recording/reproduction by an inconvenient system is enabled by pre-recording the encoding instruction and the decoding instruction instructing the processing methods for recording and/or reproduction on the recording medium along with processed data, reading the encoding instruction and the decoding instruction recorded on the recording medium and executing the processing by the thus read instruction in place of the encoding instruction and the decoding instruction inherently stored by the present device.

For increasing the versatility, the present device may be designed to read the encoding instruction and the decoding instruction from the recording medium without the present device itself having the instructions.

The present device may also be so designed that, by writing processed data and the processing contents of restoring data for replay on the recording medium, data written by an inconvenient system can be reproduced but recording cannot be made by an inconvenient system.

The method for processing data may also be recorded on the recording medium besides the processed data and the method for restoring the data.

The present device may also be designed to execute the function other than the recording/replay function if the instruction to be read and executed is different from the recording/replay function.

The concrete contents of the present invention are hereinafter explained. FIG. 2 shows a concrete arrangement of the device embodying the present invention. The hardware of the present embodiment is substantially the same as that of the conventional device shown in FIG. 1 so that the parts or components having the same functions are indicated by the same numerals. For simplicity of the explanation, the functions which are the same as those shown in FIG. 1 are not explained and only the different functions are explained.

The arrangement shown in FIG. 2 differs from that shown in FIG. 1 in that a switch 215 for instructing whether or not the encoding/decoding instructions inherently stored by the present device 100 are employed, a switch 216 for resetting the encoding/decoding instruction as read from the recording medium 199 into the signal processing RAM 106, and a switch 217 for instructing whether or not the encoding instructions are also recorded, are added along with an instruction input unit 214 for instructing the reading of the states of the switches 215 to 217.

If the switch 215 is turned on, the instruction inherently stored by the device 100 is employed, whereas, if the switch 215 is turned off, an external instruction from outside, that is, from the recording medium 199, is employed. On the other hand, if the switch 216 is turned on, the instruction read into the signal processing RAM 106 is erased, whereas, if the switch 216 is turned off, the instruction read into the signal processing RAM 106 is employed. If the switch 217 is turned on, the encoding instruction is recorded on the recording medium 199, whereas, if the switch 217 is turned off, the encoding instruction is not recorded on the recording medium 199.

Figure 3:
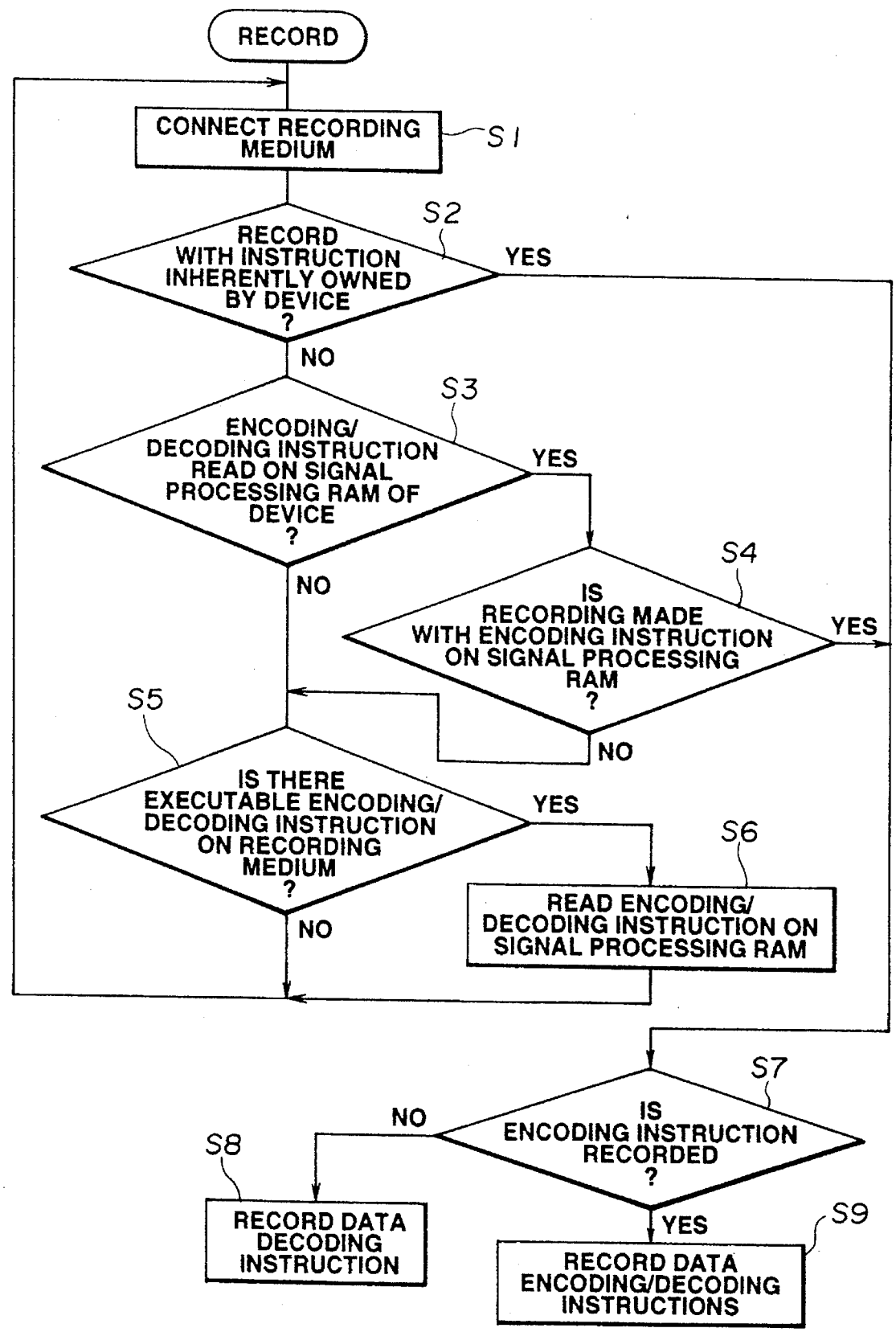
FIG. 3 is a flow chart illustrating the processing flow during recording by the present device.

FIG. 3 shows the processing flow when recording is to be made by the present device.

At step S1 in FIG. 3, the recording medium 199 is connected to the device 100. At the next step S2, it is determined, by checking the state of the switch 215, whether or not recording is made by the encoding instruction inherently stored by the device 100, that is, by the ROM 105. If the result of decision at the step S2 is YES, that is, if the switch 215 is turned on, that is, if the device is in the state of employing the encoding instruction contained in the ROM 105, control proceeds to the step S7. If the result of decision is NO, control proceeds to step S3.

It is checked at the step S3 that the encoding instruction and the decoding instruction different from those inherently stored by the device 100 have been read into the signal processing RAM 106. If the result of decision at the step S3 is YES, that is if it is, found that the instructions are already read into the RAM, control proceeds to step S4. If the result of decision is NO, control proceeds to the step S5.

At the step S4, it is decided from the state of the switch 216 whether or not recording is made using the instruction. If the result of decision at the step S4 is YES, that is, if the instruction is determined to be used at the step S4, control proceeds to the step S7. If the result of decision is NO, control proceeds to the step S5.

At the step S5, the instruction on the signal processing RAM 106 is reset, while it is checked whether or not the encoding instruction and the decoding instruction that may be executed and which are different from those present on the device 100 are present on the recording medium 199. If the result of decision is YES, that is, if these encoding and decoding instructions are found to be present at the step S5, program proceeds to the step S6 where the encoding and decoding instructions are read into the signal processing RAM 106. Control then reverts to the step S1. If the result of decision at the step S5 is NO, that is, if the instructions are found to be not present, control proceeds to the step S1.

On the other hand, it is determined at the step S7 from the state of the switch 1217, whether or not data of the encoding instruction is to be recorded during the recording of the data. The data to be processed are entered by the same sequence of operations as those used in the conventional device so as to be processed by the encoding instructions. If the result of decision at the step S7 is YES, that is, if the data of the encoding instruction is determined to be recorded, the data of the encoding and decoding instructions are recorded along with the processed data. If the data of the encoding instruction is not recorded, the processed data and the data of the decoding instruction are recorded.

Figure 4:
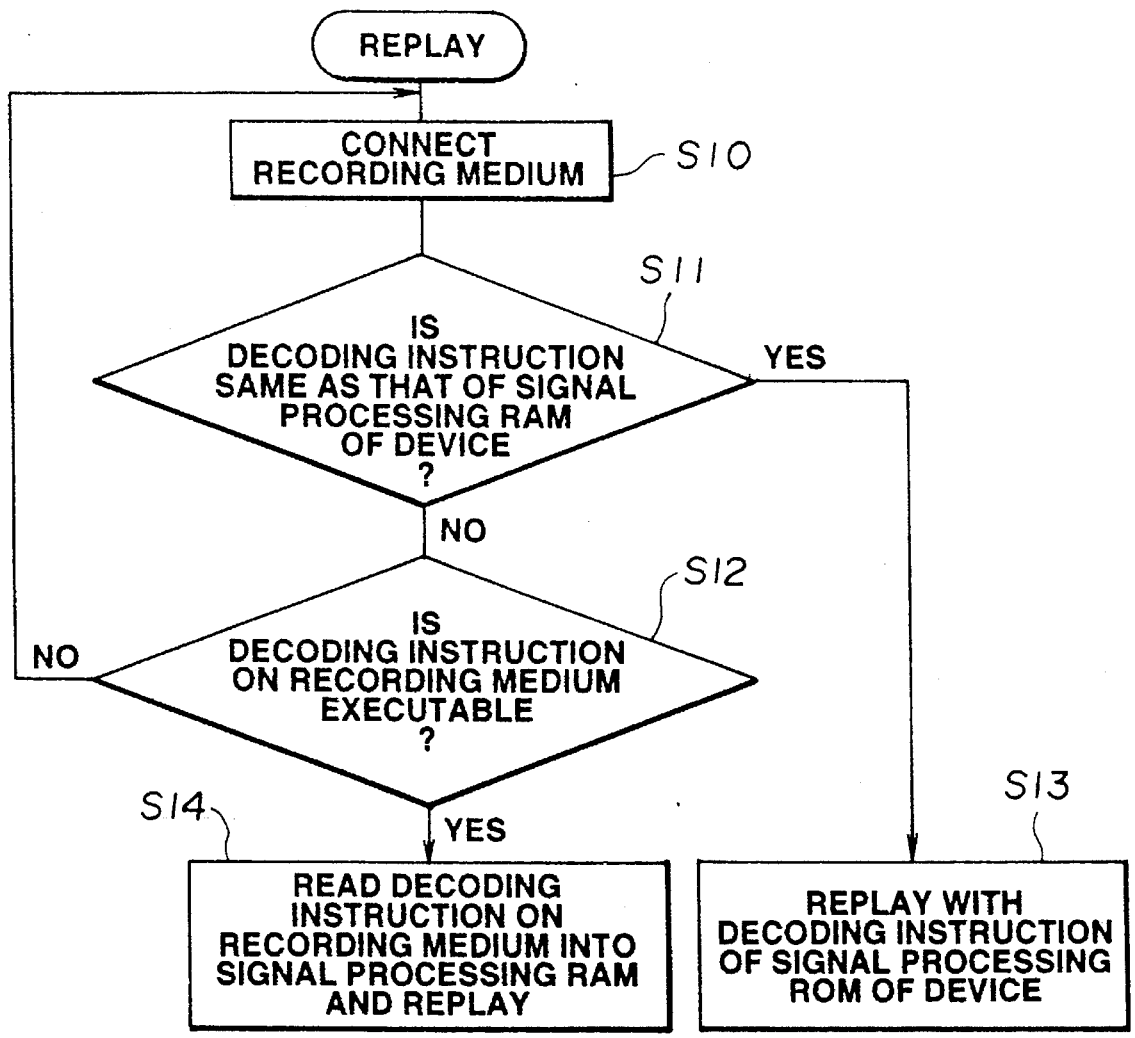
FIG. 4 is a flow chart illustrating the processing flow during reproduction by the present device.

FIG. 4 shows the processing flow during reproduction by the present device.

Referring to FIG. 4, the recording medium 199 is connected at the step S10 to the device 100. At the step S11, it is checked that the decoding instruction of the device 100 is the same as the decoding instruction of the recording medium 199. If the result of decision at the step S11 is YES, that is, if the two decoding instructions are the same, control proceeds to the step S13. If the result of decision is NO, that is, if the two instructions are determined to be different, control proceeds to the step S12.

At the step S13, the data of the recording medium 199 is restored, using the decoding instruction of the device 100, so as to be reproduced as analog music signals by the same sequence of operations as those of the conventional device.

At the step S12, it is checked whether or not the decoding instruction on the recording medium 199 can be executed. If the result of decision at the step S12 is YES, that is, if the instruction is found to be executable, control proceeds to the step S14. If otherwise, control reverts to the step S10.

At the step S14, the decoding instruction on the recording medium 199 is read into the signal processing RAM 106 and the data on the recording medium 199 is restored so as to be reproduced as analog music signals by the same sequence of operations as those of the conventional device.

By the above operations, it becomes possible to make recording with a processing system other than that stored by the device 100, or to reproduce the data processed with an impertinent processing system.

FIG. 5 shows the state in which recording/reproduction is performed using the encoding instruction #2 and the decoding instruction #2 recorded on the recording medium 199, which encoding instruction #2 and the decoding instruction #2 are different from the encoding instruction #1 and the decoding instruction #1 inherently stored by the device 100.

On the other hand, FIG. 6 shows the state in which the data recorded on the recording medium 199 is reproduced using the decoding instruction #2 different from the decoding instruction #1 inherently stored by the device 100, which decoding instruction #2 is read from the recording medium 199 into the device 100.

Figures 8A, 8B:
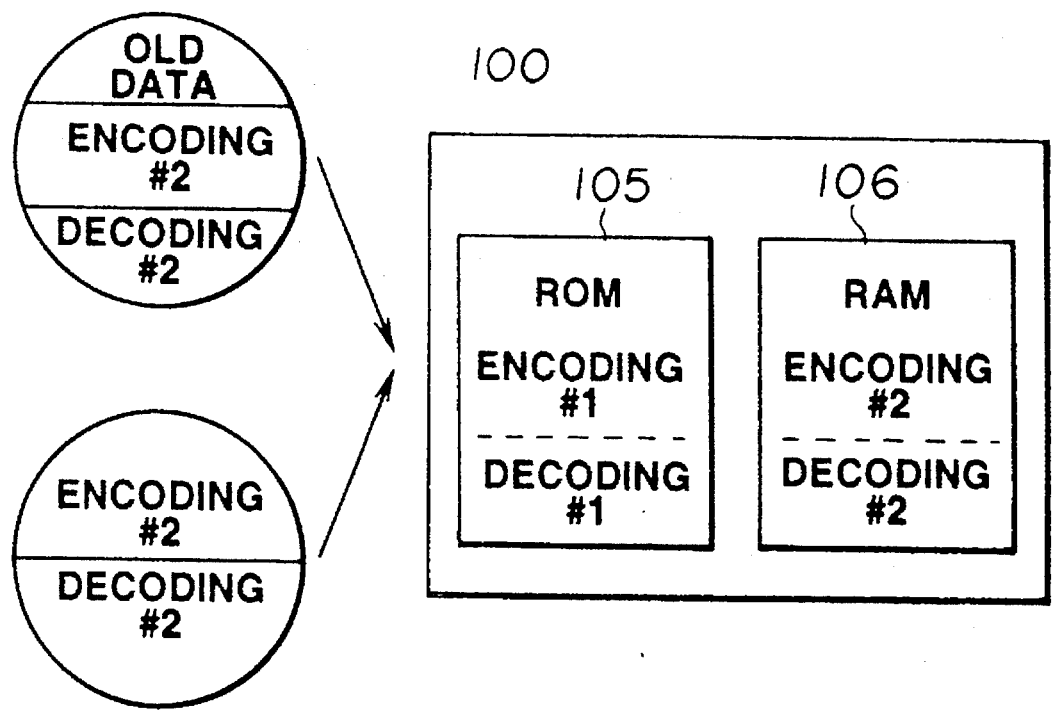
FIGS. 8A and 8B are a diagrammatic view illustrating the state of reading the encoding instruction of the recording medium.
Figures 9A, 9B, 9C:
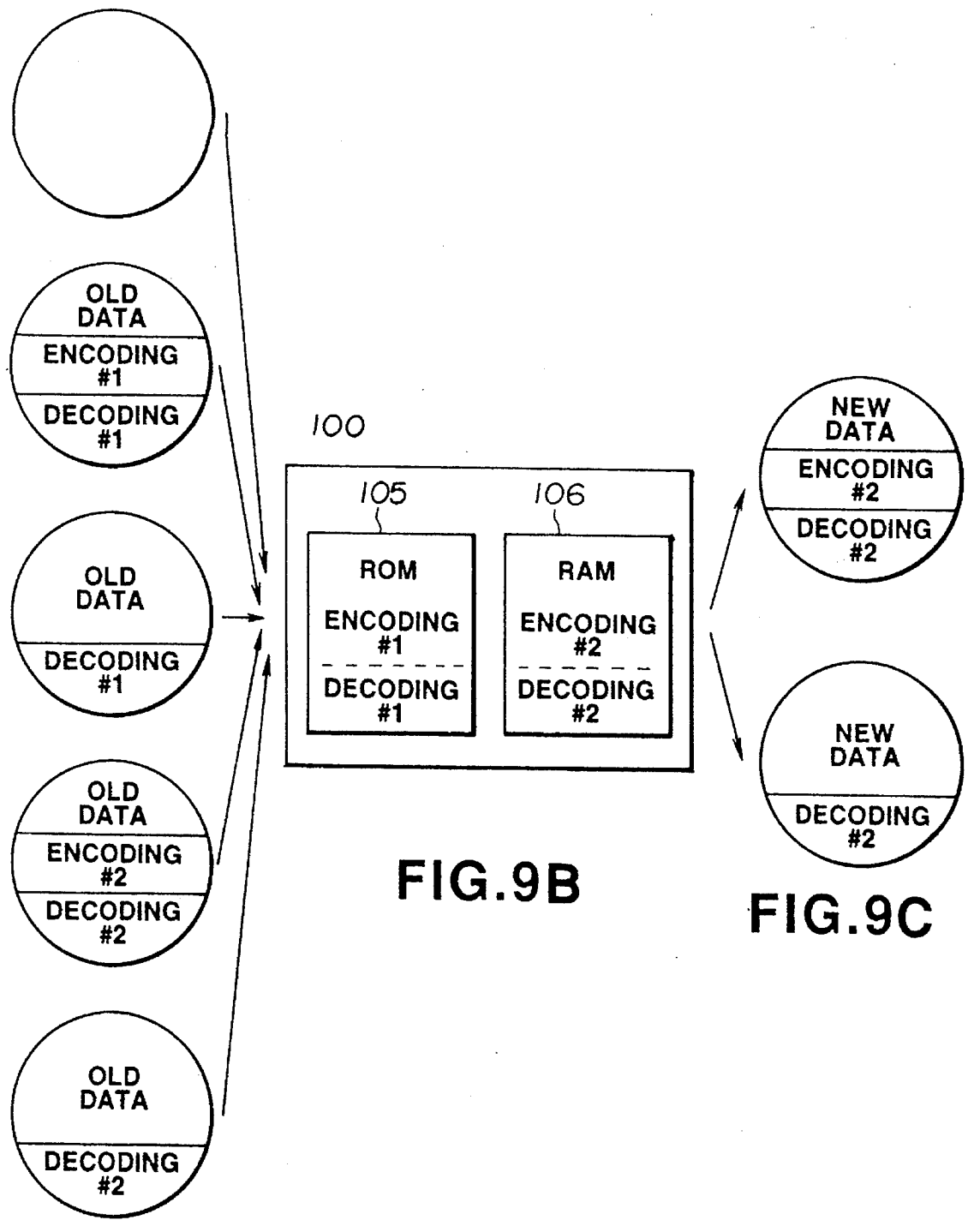
FIGS. 9A, 9B, and 9C are a diagrammatic view illustrating the state of recording by an encoding instruction read from the recording medium.

FIGS. 7 to 11 illustrate the states of the recording medium 199 and the signal processing ROM 105 and the signal processing RAM 106 in the device 100 for an exemplary case in which there exist two different encoding/decoding instructions #1 and #2. In FIGS. 7 to 11, A and B show schematically the state of the recording medium 199 and the states of the signal processing ROM 105 and RAM 106 in the device 100, respectively. In FIGS. 7 and 9, C shows schematically the state of the recording medium 199 following the recording.

Figures 11A, 11B:
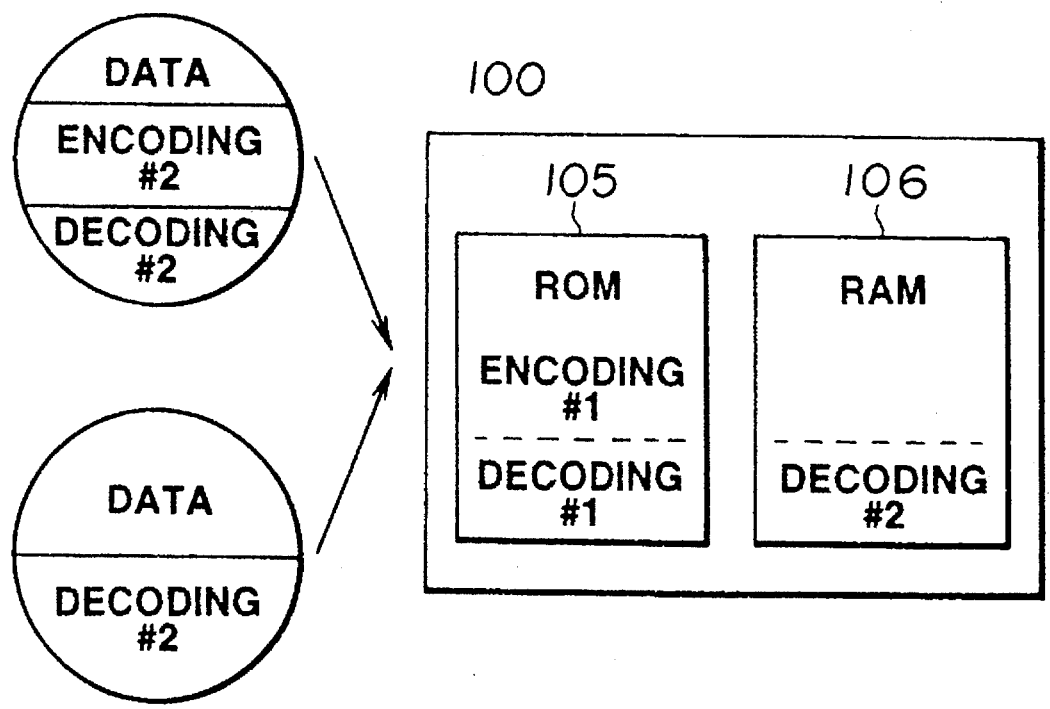
FIGS. 11A and 11B are a diagrammatic view illustrating the state of reproduction by an encoding instruction read from the recording medium.

That is, FIG. 7 shows the state in which recording is made using the encoding instruction #1 stored by the device 100 and FIG. 8 shows the state in which the encoding instruction #2 of the recording medium 199 is being read. FIG. 9 shows the state in which recording is made using the encoding instructions #1 or #2 read from the recording medium 199 and FIG. 10 shows the state in which reproduction is made using the decoding instruction #1 stored by the device 100. FIG. 11 shows the state in which reproduction is made using the instruction #2 read from the recording medium 199.

Figure 12:
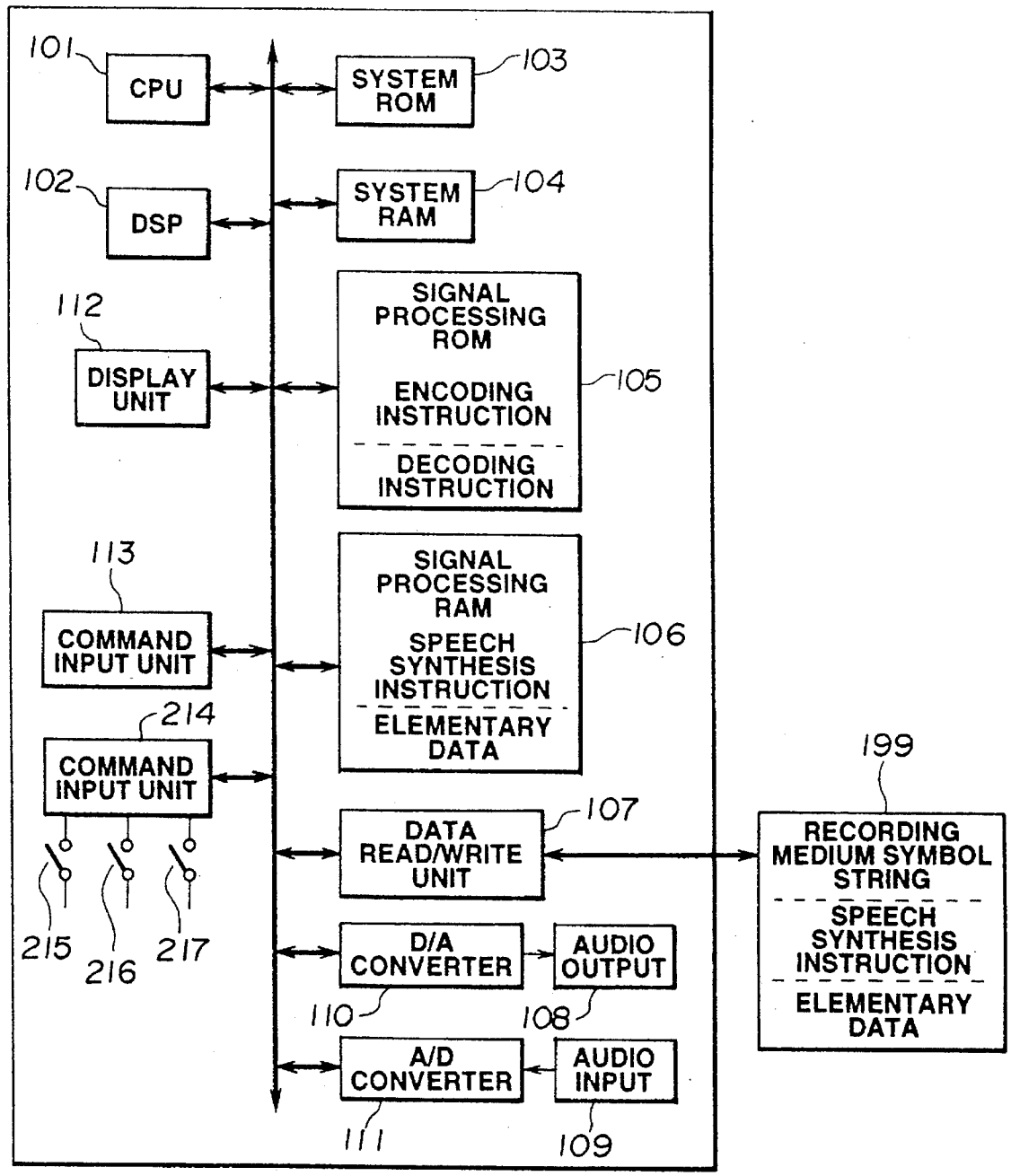
FIG. 12 is a block circuit diagram showing a concrete construction of the present device adapted as a sound synthesizing device.

FIG. 12 shows that the present device can be applied to a usage other than recording/reproduction.

FIG. 12 shows the present device as applied as the voice synthesizing device, that is a device for speech synthesis by rule. However, by employing a similar concept, it is possible for the present device to perform a variety of operations other than those of the above-described embodiment.

In FIG. 12, the parts or components similar to those shown in FIG. 2 are denoted by the same numerals and the detailed description is not made herein.

In FIG. 12, strings of symbols, instructions for speech synthesis and elementary data, which are the input data of the device for speech synthesis by rule, are recorded on the recording medium 199.

When the recording medium 199 is connected to a device 300, data recorded on the recording medium 199 is read by a data read/write unit 107. It is checked at this time whether or not the instruction for speech synthesis can be executed.

If it is decided that the instruction for speech instruction can be executed by the present device 300, the instruction for speech synthesis and the elementary data are read into the signal processing RAM 106 and accordingly the program for speech synthesis is executed at he DSP 102. The device 300 then reads the strings of symbols from the recording medium 199 and formulates speech data by carrying out the operations of speech synthesis. The digital speech signals are converted by the D/A converter 110 into analog speech signals and the synthesized speech is outputted at the audio output 108.

It is seen from above that data can be reproduced by the present device irrespective of the processing systems because the present device is capable of restoring the processed data. By setting the processed data and the data restoration method as a pair at all times, it becomes unnecessary to take into account the interchangeability due to the difference in the version such as changes in the contents of the processing systems, so that the data processed by the up-to-date processing system can be restored without being affected by the past systems. Besides, by recording only the processing contents for restoration and the processed data, it becomes impossible to process the data by the processing system, so that priority of the processing system may be maintained. The device is capable of processing the data by a processing system other than the encoding instruction stored by the device since the encoding instruction is recorded along with the decoding instruction. In addition, the present device may be applied not only as the recording/reproducing device, but also as a device in which the function of the present device can be utilized, such as a speech synthesis device, According to the present invention, the information concerning the method for recording data on the recording medium is recorded on the recording medium along with the data, so that, during replay of the recording medium, the data as read from the recording medium may be restored using the information concerning the recording method as read from the recording medium. That is, data processed with inconvenient systems or past systems can be restored easily and inexpensively for recording on or replay from the recording medium.

What is claimed is:

1. A method for recording data on and reproducing data from a recording medium, the method comprising:

recording on the recording medium encoded data, an encoding method used in recording the encoded data, and a decoding method used by a decoding device not having the decoding method prestored therein; and reproducing the encoded data recorded on the recording medium using the decoding device operating according to the decoding method recorded on the recording medium.

2. A data recording device for recording data on a recording medium, the recording device comprising:

information storing means for storing an encoding method for encoding the data in a pre-set manner and a decoding method for decoding the data encoded in the pre-set manner using a decoding device not having the decoding method prestored therein;

data encoding means for encoding the data in accordance with the encoding method stored by the information storing means; and means for recording each of the decoding method, the encoding method, and the data encoded by the data encoding means onto the recording medium, whereby the recorded data is decoded according to the decoding method by the decoding device not having the decoding method prestored therein.

3. A data recording device for recording data onto a connected recording medium which contains pre-recorded thereon an encoding method for encoding data in a pre-set manner and a decoding method for decoding data encoded in the pre-set manner, the data recording device comprising:

information storing means for storing a second encoding method for encoding data in a second pre-set manner and a second decoding method for decoding the data encoded in the second pre-set manner using a decoding device not having the second decoding method prestored therein;

information reading means for reading the pre-recorded encoding method and the pre-recorded decoding method from the recording medium;

data encoding means for selecting one of the second encoding method stored by the information storing means or the pre-recorded encoding method read by the information reading means from the connected recording medium and for encoding the data in accordance with the selected encoding method; and recording means for recording the selected encoding method and the decoding method associated with the selected encoding method along with the data encoded according to the selected encoding method.

4. A data recording medium comprising:

a first recording medium portion containing data encoded in a pre-set manner thereon;

a second recording medium portion containing an encoding method for encoding the data in the pre-set manner thereon; and a third recording medium portion containing a decoding method used by a decoding device not having the decoding method prestored therein for decoding the data encoded in the pre-set manner thereon.

5. A data reproducing device for reproducing data from a connected recording medium which contains pre-recorded thereon a decoding method for decoding data encoded in a pre-set manner along with the data encoded in the pre-set manner, the data reproducing device comprising:

information storing means for storing a second decoding method for decoding data encoded in a pre-set manner; and data decoding means for decoding the encoded data recorded on the recording medium in accordance with the second decoding method stored by the information storing means if the encoded data on the recording medium is decodable by the second decoding method stored by the information storing means.

6. The data reproducing device as claimed in claim 5, wherein the data decoding means decodes the encoded data on the recording medium in accordance with the pre-recorded decoding method on the recording medium if the encoded data on the recording medium is not decodable in accordance with the second decoding method stored by the information storing means.

* * * * *